United States Patent [19]
Butler et al.

[11] Patent Number: 5,691,706
[45] Date of Patent: Nov. 25, 1997

[54] TRANSFORMER LEAK ALARM

[75] Inventors: David McMahan Butler, Knoxville; Johnny James Clark, Maryville, both of Tenn.

[73] Assignee: Filmax, Inc., Knoxville, Tenn.

[21] Appl. No.: 720,577

[22] Filed: Oct. 2, 1996

Related U.S. Application Data

[63] Continuation-in-part of Ser. No. 692,567, Aug. 6, 1996, which is a continuation of Ser. No. 400,985, Mar. 8, 1995, abandoned.

[51] Int. Cl.$^6$ ............................................. G08B 21/00
[52] U.S. Cl. ..................... 340/646; 340/626; 174/14 R; 174/15.1; 210/87; 210/130
[58] Field of Search ........................ 340/646, 626; 174/14 R, 11 R, 15.1; 336/94, 57, 58; 165/11.1, 134.1; 95/91; 210/87, 86, 88, 126, 130

[56] References Cited

U.S. PATENT DOCUMENTS

| | | | |
|---|---|---|---|
| 2,340,898 | 2/1944 | Race | 174/14 R |
| 3,087,431 | 4/1963 | Bagwell | 417/9 |
| 3,371,299 | 2/1968 | Radkowski et al. | 336/57 |
| 3,977,970 | 8/1976 | Willis et al. | 210/87 |
| 4,037,045 | 7/1977 | Beriger et al. | 174/15.1 |
| 4,139,468 | 2/1979 | Rosaen | 210/130 |
| 4,232,551 | 11/1980 | Pierce | 368/73 |
| 4,337,820 | 7/1982 | Pierce | 165/11.1 |
| 4,424,502 | 1/1984 | Kullinger et al. | 174/14 R |
| 4,437,082 | 3/1984 | Walsh et al. | 336/58 |
| 4,477,342 | 10/1984 | Allan et al. | 210/87 |
| 5,229,745 | 7/1993 | Koide et al. | 340/626 |
| 5,244,567 | 9/1993 | Gerteis | 210/86 |
| 5,360,033 | 11/1994 | Williams et al. | 137/565 |
| 5,565,094 | 10/1996 | Zoch et al. | 210/87 |

OTHER PUBLICATIONS

Thomas Products, Ltd., *Level & Flow Switches*, Copyright© 1994 Thomas Products, Ltd.

*Turck Capacitive Sensors*, pp. D31, D32, D9 & D10: Turck, Inc., 3000 Campus Drive, Minneapolis, MN 55441.

Turck, Inc., *Inductive Proximity Sensors Specialized Sensors & Interface Devices Intrinsically-Safe Sensors & Interface Devices*, 3000 Campus Drive, Minneapolis, MN 55441.

*Intelligent Sensing*, Proximity Sensor For Presence, Position, Mass & Moisture; CASI, Computer Application Systems, Inc., 100 Cherokee Blvd., Suite 322, Chattanooga, TN 37405.

*Oil-Alert*, Detect Small Leaks: Dorlen Products, Inc., 6615 West Layton Avenue, Milwaukee, WI 53220.

*Solid State Thermally Actuated Flow Switch/Monitor*, E-T-A® Control Instuments, 1551 Bishop Court, Mt. Prospect, Il 60056.

*Optical Liquid Level Sensor*. Model LV170; Unknown Manufacturer.

(List continued on next page.)

*Primary Examiner*—Jeffery Hofsass
*Assistant Examiner*—John Tweel, Jr.
*Attorney, Agent, or Firm*—Luedeka Neely & Graham, P.C.

[57] ABSTRACT

Insulating oil in electric power transmission devices such as a transformer is filtered for removal of accumulated water and carbon particles. The filter and circulation pump are usually located in a separate cabinet external to the transformer with circulation conduits connecting the filter, the pump and the transformer. To prevent or minimize environmental contamination by leaks or ruptures in the oil circulation conduits, oil flow within the pump suction conduit is monitored independently of oil pressure within the pump discharge conduit. A flow rate or discharge pressure below a predetermined minimum operates motor control relays to terminate the pump drive motor operation and transmit appropriate alarms. Additionally, an accumulation of oil in the dry sump volume of a pump and filter housing also activates motor terminating relays and transmits an alarm. Simultaneous with disconnection of the pump drive source, the pump suction conduit is closed by a normally closed solenoid valve positioned in the line near the power transmission device.

16 Claims, 4 Drawing Sheets

OTHER PUBLICATIONS

*High–Level Alarm*, Kinematics & Controls Corporation, 14 Burt Drive, Deer Park, NY 11729–5702.

*Liquid Level Controllers*, Microprocessor Based; Kinematics & Controls Corporation, 14 Burt Drive, Deer Park, NY 11729–5702.

*Installation Outline Drawings*; Kinematics & Controls Corporation, 14 Burk Drive, Deer Park, NY 11729–5702.

*Liquid Level Sensors*, TRP Series, Kinematics & Controls Corporation, 5125 Series, 14 Burt Drive, Deer Park, NY 11729–5702.

*Liquid Level Sensors*, 5136 Series; Kinematics & Controls Corporation, 14 Burt Drive, Deer Park, NY 11729–5702.

*Liquid Level Sensors*, 5092 Series; Kinematics & Controls Corporation, 14 Burt Drive, Deer Park, NY 11729–5702.

*Fiber–Optic Liquid Level Sensors*, Series 5050, Kinematics & Controls Corporation, 14 Burt Drive, Deer Park, NY 11729–5702.

*Discriminating Liquid Sensor for Interstital Applications*, IMO Industries, Inc.; GEMS Environmental Products, One Cowles Road, Plainville, CT 06062.

*Hydrostatic Reservoir Sensors*, IMO Industries, Inc.; GEMS Environmental Products, Gems Sensors Division, One Cowles Road, Plainville, CT 06062.

*High Level Indicator*, IMO Industries, Inc.; GEMS Environmental Products, Gems Sensors Division, One Cowles Road, Plainville, CT 06062.

*Groundwater Sensor*, IMO Industries, Inc.; GEMS Environmental Products, Gems Sensors Division, One Cowles Road, Plainville, CT 06062.

*Smartwell: Portable System for Groundwater Monitoring*, IMO Industries, Inc.; GEMS Environmental Products, Gems Sensors Division, One Cowles Road, Plainville, CT 06062.

*The Universal Liquid Level Sensor*, IMO Industries, Inc.; GEMS Environmental Products, Gems Sensors Division, One Cowles Road, Plainville, CT 06062.

*Discriminating Containment Sump Sensor*, IMO Industries, Inc.; GEMS Environmental Products, Gems Sensors Division, One Cowles Road, Plainville, CT 06062.

*The Bracketed Liquid Level Sensor*, IMO Industries, Inc.; GEMS Environmental Products, Gems Sensors Division, One Cowles Road, Plainville, CT 06062.

*Dispenser Shutdown Retrofit Assembly*, IMO Industries, Inc.; GEMS Environmental Products, Gems Sensors Division, One Cowles Road, Plainville, CT 06062.

*Self–Checking High Level Indicator*, IMO Industries, Inc.; GEMS Environmental Products, Gems Sensors Division, One Cowles Road, Plainville, CT 06062.

*Interstitial, Electro–Optic Liquid Sensor*, IMO Industries, Inc.; GEMS Environmental Products, Current Loop Output, Gems Sensors Division, One Cowles Road, Plainville, CT 06062.

*Interstitial Liquid Sensor*, IMO Industries, Inc.; GEMS Environmental Products, Gems Sensors Division, One Cowles Road, Plainville, CT 06062.

*Interstital, Electro–Optic Liquid Sensor*, IMO Industries, Inc.; GEMS Environmental Products, Gems Sensors Division, One Cowles Road, Plainville, CT 06062.

*Discriminating Liquid Sensor for Interstitial Applications: Current Loop Output*, IMO Industries, Inc.; GEMS Environmental Products, Gems Sensors Division, One Cowles Road, Plainville, CT 06062.

GEMS Products for AST Leak Detection.

GEMS Products for UST Leak Detection.

*Leak Detection Sensors*, IMO Industries, Inc.; GEMS Environmental Products, Gems Sensors Division, One Cowles Road, Plainville, CT 06062.

*Fig.* 1

TRANSFORMER LEAK ALARM

RELATED APPLICATION

The present invention is a continuation-in-part of presently copending application Ser. No. 08/692,567 filed Aug. 6, 1996 which is a continuation of application Ser. No. 08/400,985 filed Mar. 8, 1995 and now abandoned.

BACKGROUND OF THE INVENTION

The present invention generally relates to electric power transmission devices. More particularly, the invention relates to apparatus and methods for preventing environmental contamination by the escape of dielectric insulation oil.

Electric power transmission devices such as transformers and switch gear are often immersed in a specially compounded oil with dielectric properties for purposes of insulation, isolation and cooling. On occasion, these devices generate extremely high operating temperatures. Although the oil will not burn in the absence of atmosphere or oxygen, small portions will directly decompose under the intense heat of electrical arcing. Such decomposition transforms the oil into elemental carbon, which remains in the remaining oil reservoir as suspended graphite particles.

Additionally, the chemical nature of the oil is hydrophilic. Any atmospherically carried water coming into surface contact with the oil is adsorbed and entrained.

Both, water droplets and graphite particles are intolerable contaminants of the oil and must be removed, either periodically or continuously. Fortunately, both contaminants are effectively removed by relatively simple, depth wound, unsized paper reel filters. A traditional installation often will connect a transformer oil cavity by external plumbing conduits to adjacently housed pump and filter units. Circulation around the conduit loop is driven by the pump motor which is controlled by cycle timers and filter pressure differential monitoring switches. Circulation may be continuous or intermittent, depending on the type of transformer or the service to which it is applied.

An adverse consequence of such dielectric oil is the environmentally hazardous nature of its chemical composition. Consequently, these oils are heavily regulated and monitored. Affected site clean-ups due to leaks and spills are extremely expensive and subject to the responsible manager to fines and other penalties. Accordingly, great care is exercised in handling these fluids and every reasonable precaution is taken to prevent leaks form the external filter circulation system. Nevertheless, leaks can and do occur.

It is, therefore, an object of the present invention to protect the local environment from leaks and other losses of insulating oil from transformer and other electrical power transmission devices.

Another object of the present invention is the provision of an alarm system to alert responsible management of a defective transformer oil circulation system.

A further object of the present invention is provision of a secondary conduit system enclosing the primary insulation oil circulation system for an electric power device.

Another object of the invention is a control system to inactivate the oil circulation system when flow within the circulation pump suction line falls below a predetermined minimum.

Another object of the invention is a control system to inactivate the oil circulation system when pressure in the circulation pump discharge conduit falls below a predetermined minimum.

Another object of the invention is a control system to inactivate the oil circulation system when the presence of free oil is detected on the sump floor of an oil circulation equipment cabinet.

Another object of the present invention is a control system that will automatically inactivate the motor start/run controls of an oil circulation system, when neither oil flow nor pressure rise to minimum thresholds.

SUMMARY OF THE INVENTION

These and other objects of the invention are provided by an independent insulating oil circulation system having a motor driven pump connected in fluid circuit with a filter unit. The pump, motor and filter assembly are preferably secured within an independent cabinet enclosure above a normally dry reservoir volume.

The cabinet reservoir volume is guarded by a fluid sensor such as a level switch to indicate the presence of oil within the normally dry reservoir.

Primary circulation conduits connect the filter and pump, respectively, with the oil filled cavity of an associated electric power transmission device such as a transformer, load tap changer, breaker, closure, reclosure, switch or switching bank. A full circulation loop at least includes a conduit from the transmission device oil cavity to the pump, a flow connection between the pump and the filter, a conduit between the filter and the transmission device oil cavity and an internal flow connection within the transmission device oil cavity between the pump conduit connection and the filter conduit connection.

Fluid-tight housings are secured to the external surface of the transmission device casement around respective circulation conduit connectors to or through the casement whereby the point of casement penetration by the connector is enclosed by a secondary containment volume. These housings are of such dimension and volume as to permit hand-tool accessibility through resealable port covers to the circulation conduit connectors.

The circulation conduits enter the secondary containment housing and the isolation cabinet through sealed bulkhead connectors. The bulkhead connectors are continuously interconnected by large conduit for a continuous enclosure therebetween. Accordingly, a sealed and continuous secondary fluid flow channel is established around the primary circulation system with the pump/filter cabinet reservoir preferably at the elevationally lowest point in the system. Oil escaping from the primary circulation circuit at any point outside of the transmission device case will gravity drain to the cabinet sump volume. Depending on the type of fluid detection system used, when sufficient oil accumulates in the sump, an alarm signal is transmitted to the filter circulation and central control systems to stop the pump drive and seal off the primary circulation circuit from the oil cavity of the transmission device.

An independent fluid loss alarm system may include a low flow monitor in the pump suction conduit and a low pressure monitor in the pump discharge conduit prior to the filter inlet. Both, the low flow monitor and the low pressure monitor are electrical signal transmitting devices whereby a signal begins when a threshold value of the monitored fluid status is passed.

In the case of the low flow monitor located in the pump suction conduit, a rupture within the conduit would divert oil from the pump thereby closing the contacts of a switch that are maintained in an open status by fluid flow within the conduit above a predetermined minimum threshold. When the low flow monitor contacts close, a series of electrical events follow toward the end result that the pump drive motor is stopped, an audible or visual alarm is started and an automatic valve in the pump suction conduit proximate of the transmission device closes to prevent further fluid loss by siphoning.

The low pressure monitor in the pump discharge compliments the low flow monitor. That section of oil circulation conduit between the pump discharge and the filter inlet normally operates with the greatest pressure in the circuit. Moreover, as the filter accumulates contaminates, the pressure therein progressively grows. Consequently, pressure at this point in the system is normally monitored for an excessively high pressure. However, an excessively low pressure at this point, independent of a low suction flow suggests an internal pump seal failure, a motor failure or even a drive coupling failure.

As in the case of the low flow monitor, the low pressure monitor initiates signal transmission when pressure between the pump discharge and the filter inlet falls below the predetermined threshold. This event also disconnects the motors, starts the alarms and closes the automatic valve in the pump suction line.

To prevent excess oil loss by siphoning through the circulation conduit between the filter and the transmission device, a mechanical flow check valve is provided near the transmission device.

BRIEF DESCRIPTION OF DRAWINGS

The advantages and further aspects of the invention will be readily appreciated by those of ordinary skill in the art as the same becomes better understood by reference to the following detailed description when considered in conjunction with the accompanying drawings in which.

DESCRIPTION OF THE PREFERRED EMBODIMENT

Figure 1:
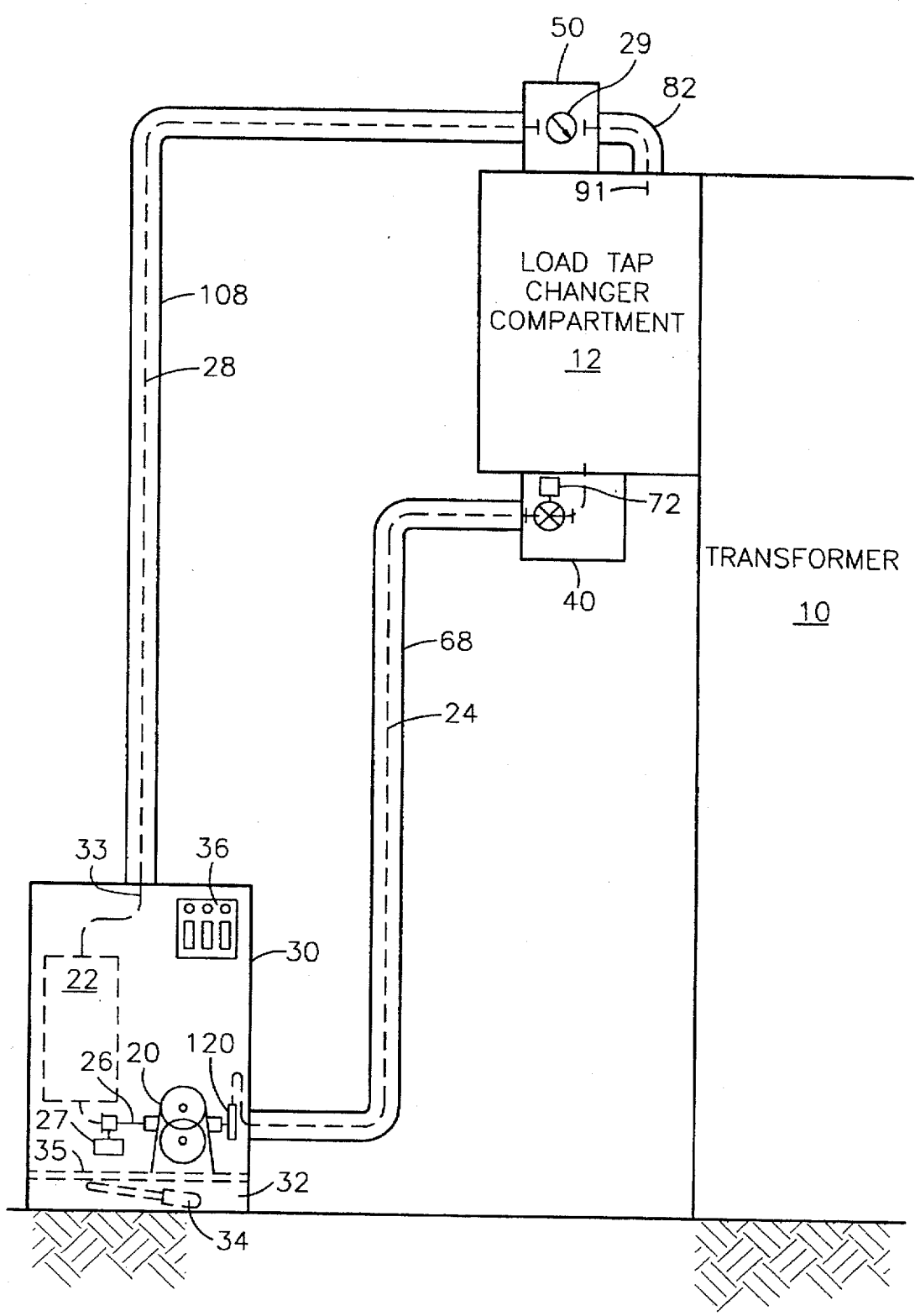
FIG. 1 is a fluid circulation schematic of the present invention.

Relative to the drawings wherein like reference characters designate like or similar elements throughout the several figures of the drawings, FIG. 1 schematically shows a fluid circuit of the invention supporting the load tap changer 12 of an electric power transformer 10. Typically, such a power transformer stands about 10 to 14 ft. high with a nominal diameter or rectangular side dimension of 3 to 6 feet across. The transformer 10 and load tap changer 12 of FIG. 1 are merely representative of many types of electric power transmission devices that further include breakers, closures, reclosures and switches.

Each transformer casement is usually externally finned for heat dissipation and sealed to prevent loss and leakage of internal fluids which immerse a plurality of core and winding assemblies. The internal fluid is an oil substance, not necessarily petroleum based, but moderately viscous and highly dielectric to insulate the several winding sets from arcing between themselves and the transformer case. Localized heating of the oil stimulates internal convective circulation which transfers the heat generated by electrical transform losses to the outer case for conduction therethrough to the exterior dissipation fins. Pumps and radiators may also be used to cool the insulating oil.

The load tap changer is a mechanical switching array by which the transformer output is regulated for line demand. The electrical arcing usually incident to the closure and opening of charged electrical contacts is a momentary point source of extreme heat if not vacuum isolated. Such extreme heat on the presence of the insulating oil generates particulate graphite from a dissociation of the oil. Such particulate graphite becomes a contaminant in the oil body and contributes to a reduction of the dielectric property of the oil. For reasons which amount to a greater propensity for contaminant generation, a load tap changer oil cavity of 300 to 800 gallons capacity is frequently isolated from the oil cavity respective to the transformer winding case. Breakers, closures, reclosures and switch boxes may encase 50 gal. to 200 gal. of dielectric insulating oil.

Typically, the transformer or load tap changer insulating oil is circulated by a positive displacement pump 20, such as a gear pump, through a filtration unit 22. Conduit section 24 provides a fluid flow channel between the bottom of the load tap changer oil cavity (FIG. 4) and the pump 20 suction connection. Pump discharge conduit 26 connects to the inlet of filter 22. Return conduit 28 carries the oil circulation flow loop back to load tap changer (FIG. 3) 12.

The pump 20 and its associated electric motor 21 (FIG. 2), the filter 22 and the related electric control panel 36 are housed within a cabinet enclosure 30 which is generally located closely adjacent to the transfer load changer 12 and elevationally below the conduit 24 and 28 connection points with the load tap changer.

Also within the enclosure 30, preferably at an elevational point below the points 31 and 33 where the conduits 24 and 28 penetrate the enclosure cabinet is a normally dry oil sump reservoir 32. A perforated cabinet floor 35 preferably, but not necessarily, separates the upper volume of the cabinet enclosure from the lower reservoir volume 32. Fluid presence within the reservoir 32 is monitored by a level sensor 34 shown to be a float switch such as the LS-7 Series of the Gems Sensors Division, Imo Industries Inc., Plainville, Conn. It should be understood that no particular volume of oil is required in reservoir 32 for effecting a signal from the sensor 34. Accordingly, any of numerous sensor types may be used equivalently in this application. For example, a dielectric sensor which measures the dielectric strength of a fluid covering the sensor surface would signal not only the presence of the insulation oil when air over the sensor surface is displaced but also the dielectric condition of the oil contacting the sensor surface. Other sensor types that may be used are ultrasonic sensors that respond to volumetric changes within the reservoir and special sensors that respond to the light color reflected from the reservoir floor.

At each of the load tap changer case penetration points for the primary circulation conduits 24 and 28, connector housings 40 and 50 are provided. Each of housings 40 and 50 are of different style suited for a particular installation circumstance. Depending on the mix of these installation circumstances, either housing type could be used at both locations or other, functionally equivalent, secondary containment housings may be used.

Figure 4:
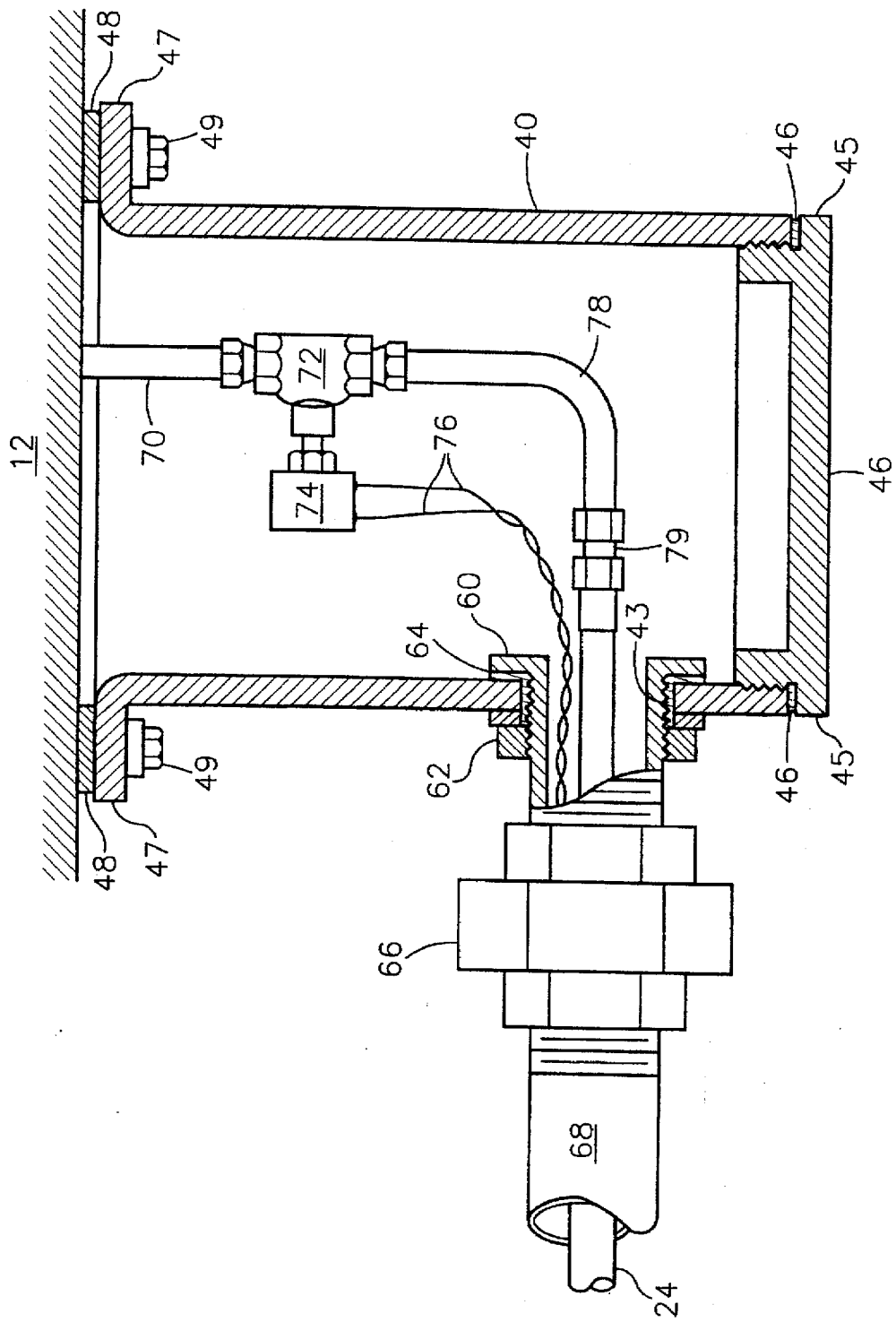

In the example of the penetration housing 40 for the suction conduit 24 shown best by FIG. 4, the housing body is a flanged cylinder that is secured fluid tightly against the load tap changer case 12 by the clamping pressure of machine screws 49 compressing a gasket 48 into the opposite faces of the load tap changer case and the flange 47. At the other or bottom end of the flanged cylinder, the open cylinder bore is closed by the flange 45 of a threaded plug 44 compressing a ring gasket 46.

An aperture 43 in the cylinder 40 wall receives a flanged bulkhead nipple 60 which is drawn by a compression nut 62 against a gasket 64. The exterior threaded end of the bulkhead nipple is provided with half of a pipe union 66. The other half of the pipe union 66 is threaded upon a pipe sleeve 68 that completely encloses the pump suction conduit continuously to the cabinet enclosure 30.

Threaded plug 46 provides resealable tool access to the interior of housing 40 while in sealed position against the load tap changer case 12. Within the housing 40, oil flow from the load tap changer through the pipe stub 70 is controlled by a normally closed electric solenoid valve 72 that is opened by energizing the winding 74 and conductors 76. A 90° elbow sub 78 connects the valve 72 to the conduit 24 with a tubing union 79.

Figure 3:
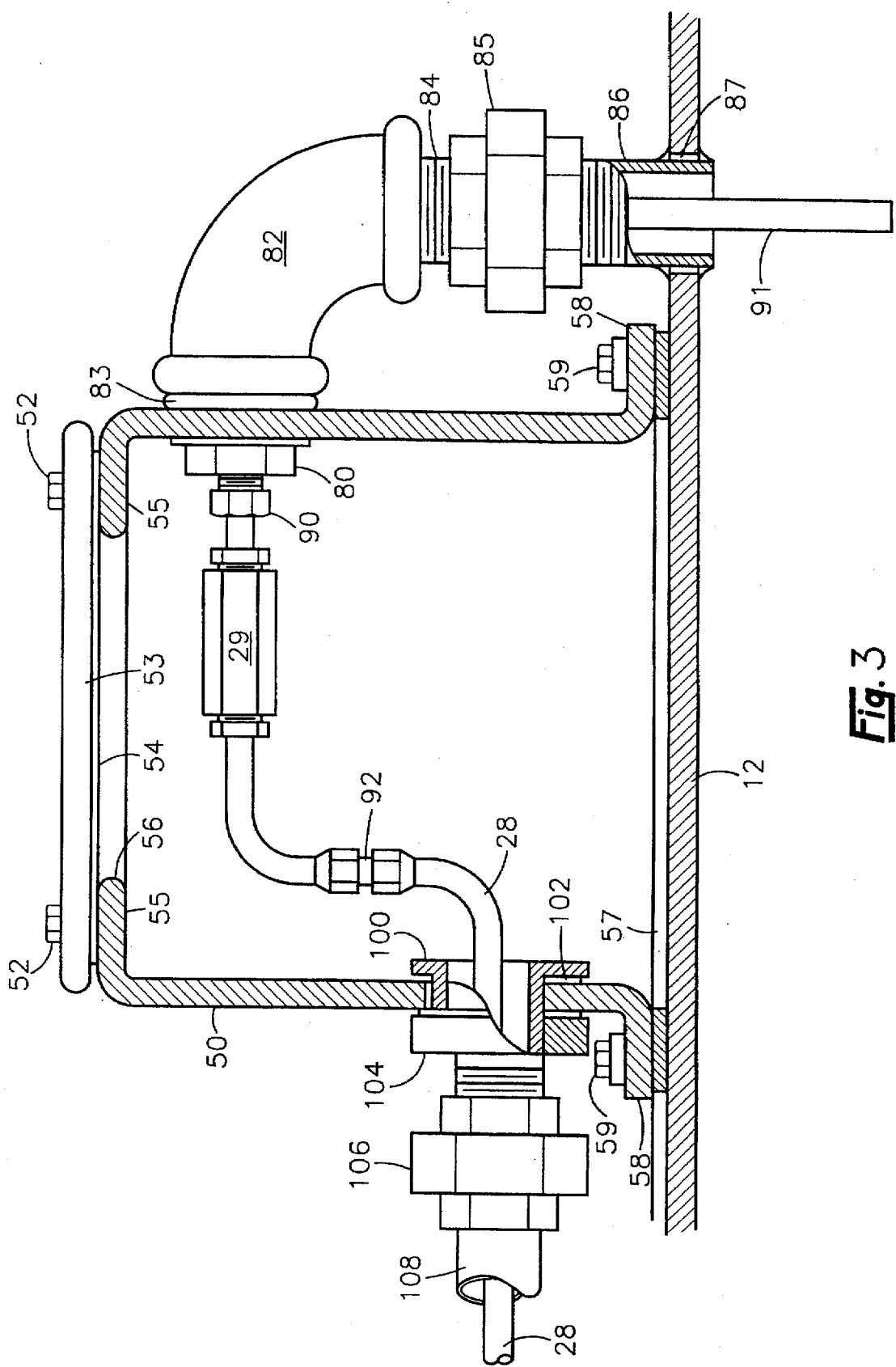
FIG. 3 is a partially sectioned detail of an upper surface connector housing: and, FIG. 4 is a partially sectioned detail of a lower surface connector housing.

Penetration housing 50 of FIG. 3 may have a cylindrical or rectangular sectional form that is secured by machine screws 59 through an integral flange 58 sealed against a gasket 57. Access to the interior of the housing 50 is provided through an end port 56. A cover 53 secured by machine screws 52 against a gasket 54 and an internal flange 55 provides resealable tool access to the interior of the housing 50.

Through one aperture in the wall of housing 50 is a threaded bushing 80 screwed into a 90° ell 82 to compress a gasket or O-ring 83 against the exterior face of housing 50. A nipple 84 connects the 90° ell to half of a pipe union 85. The other half of the union 85 is threaded upon a stub 86 welded into an aperture 87 in the load tap changer casing. A compression nut 90 threaded into the face of bushing 80 seals and secures a subsection of tubing 91 within the 90° ell 82. An extended tail of the subsection 91 extends through the stub nipple 86 into the load tap changer oil cavity. Within the interior of the housing 50, the tubing subsection 91 is flow connected by union 92 to a terminal end of return conduit 28. A mechanical check valve 29 between the tubing union 92 and the subsection 91 rectifies flow within the return conduit 28 and prevents siphoning in the event of line rupture.

A second aperture through the wall of housing 50 is sealed by a flanged bulkhead nipple 100 compressed against a gasket 102 by a nut 104. The threaded outer end of the nipple 100 receives half of a union 106. The other half of the union 106 is threaded upon a pipe sleeve 108 that encloses a fluid drain channel around the return conduit 28 between the connector housing 50 and the cabinet 30.

Figure 2:
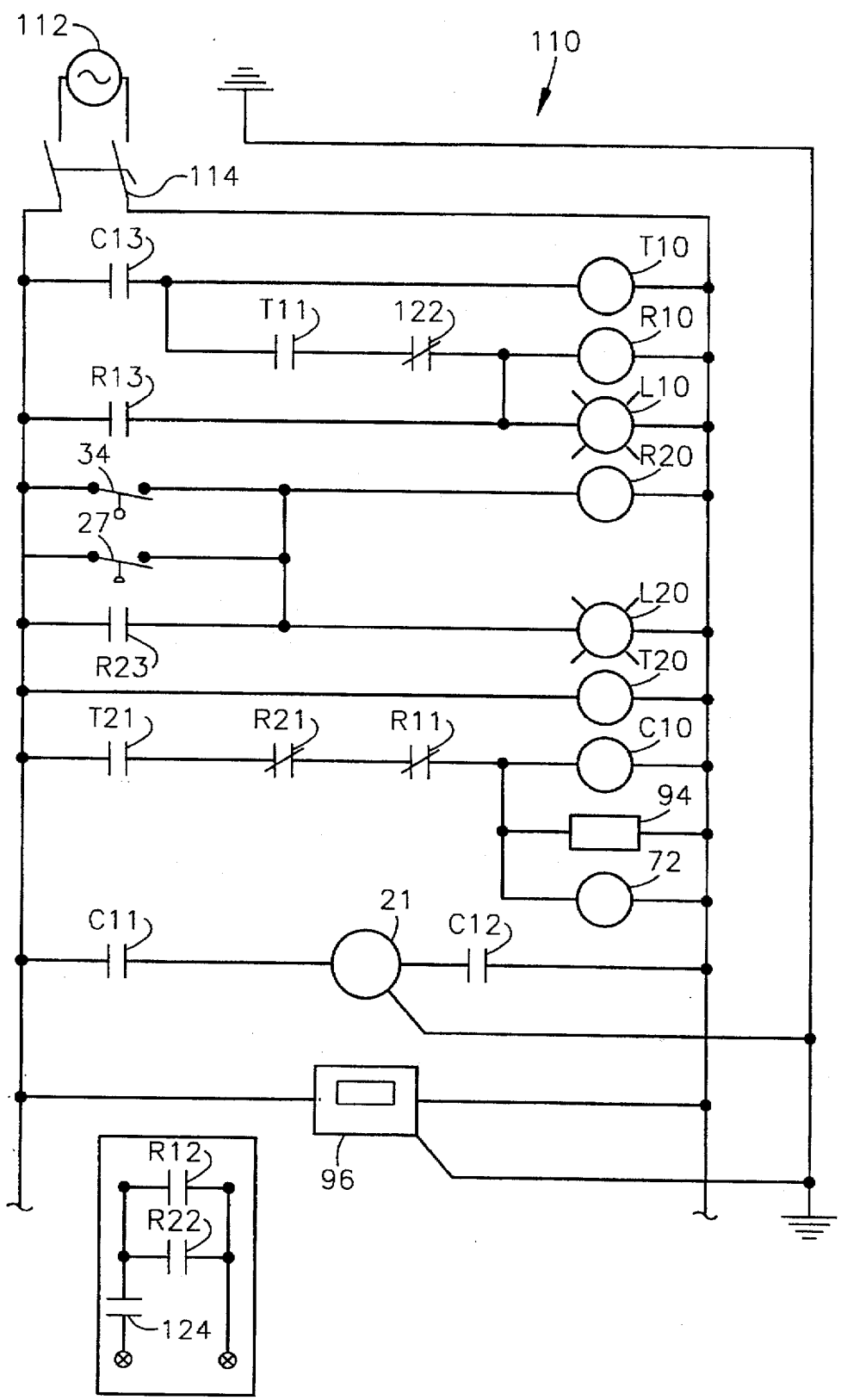
FIG. 2 is an electrical control schematic of the invention.

The pump motor and alarm control shown schematically by FIG. 2 includes a 120 VAC power circuit 110 connected to a line power source 112 by a manual master switch 114 to energize the pump motor 21. An alternative embodiment of the invention may provide an electric clutch connection between the pump 20 and motor 21 whereby the motor runs continuously to drive other units or equipment and a mechanical drive connection between the motor and pump is disengaged.

When the contacts of switch 114 are closed, the coil T20 of a 24 hour cycle interval timer closes relay contact T21 which is connected in a series subcircuit with two normally closed relay contacts R11 and R21 and a relay activating coil C10. Closure of the relay contact T21 energizes the coil C10 which consequently closes the motor 21 starting contact C11 and C12. Coil C10 also operates relay contact C12 to energize the relay operating coil T10 of a system start protection timer after a brief delay of 60 seconds, for example. Energization of timer coil T10 closes the timer contact T11 in series with the normally closed contacts 122 of a flow switch 120 in the pump suction conduit 24. Representatively, flow switch 120 may be a Suttner Model ST-5 or ST-6 flow switch product of Suttner America Company of West Dubuque, Iowa. When fluid flow within the suction conduit 24 exceeds a predetermined minimum, 0.50 gpm for example, the contacts 122 of switch 120 open.

Completion of the subcircuit that includes contacts C13, T11 and 122 illuminates the low flow indicator lamp L10 and energizes the relay coil R10 so long as the flow switch contacts 122 are closed. However, if normal flow within the suction conduit 24 begins in timely response to the motor 21 and pump 20 operation, the normally closed contacts 122 of flow switch 120 will open before the timer coil T10 is energized. Consequently, when the timer coil T10 operates to close the relay contacts T11, the energization circuit of relay coil R10 is already opened at the flow switch contacts 122. Accordingly, relay coil R11 remains passive and the switches R12 and R13 operated by coil R10 remain open and the normally closed switch R11, opened by coil R10, remains closed.

Conversely, if the positive displacement pump 20 loses its suction prime as by a rupture or major leak in suction conduit 24, flow within the conduit 24 will cease thereby closing the low flow switch contact 122 or keeping them closed if already in that condition. Following the initial, 60 second, time delay after start-up, the timer coil T10 is energized to close timer relay contacts T11. With the contacts T11 and 122 closed, the low flow alarm signal lamp L10 illuminates and relay coil R10 activates to close the external alarm switch R12 and the relay holding switch R13. Normally closed relay switch R11, which is in series subcircuit with the cycle timer switch T21 and normally closed relay switch R21, is simultaneously opened by energization of relay coil R10 thereby deenergizing the coil C10 of the motor starting relay which releases and opens the motor relay contacts C11, C12 and C13.

Once closed, the holding relay switch R13 maintains energy on its own holding coil R10 and on the relay switch R11. Continued activation of the switch R11 holds the starting relay coil C10 passive and its respective switches C11, C12 and C12 open.

Pump 20 discharge conduit 26 is monitored by a pressure transducer 27 such as the Series J. Tripoint product of the Automatic Switch Co. of Florham Park, N.J. Normal operation of the pump 20 produces a discharge pressure of about 30 psi and 3 gpm, for example. The pressure will increase as the filter 22 loads with impurities. However, if a pump seal ruptures, the pump discharge pressure may fall to 2 to 5 psi. The same kind of discharge pressure loss occurs when the pump prime is lost in the suction conduit 24. In either case, a low discharge pressure indicates a malfunction of the nature that prudent practice would shut down the system. Accordingly, low pressure switching contacts of the pressure transducer 27 are placed in parallel circuit with the contacts of the level sensor 34 and relay holding contacts R23.

Regardless of whether an emergency condition arises by loss of pump discharge pressure or by equipment seal or connection leakage, either or both pressure transducer switch 27 or level sensor switch 34 will close to energize relay coil R20. This coil R20 activates the relay contacts R21, R22 and R23. Relay contact R21 is, like contact R11, normally closed and in series with R11 and timing relay contact T21 to energize motor relay coil C10. When relay contact R21 is activated and opened, the motor contacts C11, C12 and C13 are also opened thereby stopping the pump operation.

Relay contact R22, in parallel with relay contact R12, activates an external alarm. Closure of relay contact R23 energizes the relay coil R20 directly to continue the external alarm connected by relay contact R22 and the illumination of lamp L20. Additionally, continued energization of relay coil R20 also holds the relay contact R21 open thereby preventing restart of the motor 21 by preventing the energization of starting relay coil C10. A manual switch 124 in the external alarm subcircuit is provided to terminate the alarm operation when desired.

It will also be noted from the FIG. 2 schematic that the operating coil of normally closed solenoid valve 72 is connected in parallel with the motor start/run relay coil C10 and a cumulative running time meter 94. Consequently, those conditions that will terminate operation of the pump motor 21 by deenergizing motor relay coil C10 will also deenergize the valve 72 operating coil thereby closing the normally closed solenoid valve 72.

A thermostatically controlled cabinet heater 96 is connected across the power supply leads to maintain a minimum cabinet enclosure temperature in frigid environments. Such minimum temperature forestalls low temperature related component failures.

Although a preferred embodiment of the invention elevationally positions the sump volume 32 and fluid sensor 34 below the load tap changer connection housings, those of ordinary skill may reverse this alignment and position the pump higher than either of the connector housings. Such may be the case for circulation of insulation oil from the transformer 10 case cavity and the desirability of placing the pump suction housing 40 near the transformer case bottom. Such an elevational reversal of the invention components may be readily accommodated by positioning the fluid sensor 34 within the lowest connector housing or wherever the lowest gravity flow position is in the circulation system.

It also should be noted that more than one fluid sensor 34 may be employed by the invention. For example, parallel connected fluid sensors may also be positioned in both of the connector housings 40 and 50.

Having fully disclosed the preferred embodiments of our invention, those of ordinary skill in the art may devise obvious equivalences and alternatives. As our invention, however,

We claim:

1. The combination of:
   an electric power transmission device selected from the group consisting essentially of a transformer, load tap changer, breaker, closure, reclosure, switch and switching bank;
   a quantity of dielectric oil for circulation through said power transmission device;
   an oil filtration unit external of said power transmission device having filter means, pump means, first oil conduit means, second oil conduit means and third oil conduit means, said first oil conduit means connecting said filter means with said power transmission device, said second oil conduit means connecting said power transmission device with a suction inlet of said pump means and said third oil conduit means connecting said filter means with a discharge from said pump means;
   electric motor means for driving said pump means to circulate said quantity of dielectric oil through said electric power transmission device, said filter means and said first, second and third oil conduit means;
   electric motor control means for energizing and de-energizing said electric motor means, said motor control means including an oil flow sensor and a first solenoid valve in said second oil conduit means; said first solenoid valve being closed to interrupt flow through said second oil conduit means, said motor control means being operative to de-energize said electric motor means and to close said first solenoid valve means when said flow sensor detects a value of oil flow within said second oil conduit means to be less than a predetermined value.

2. A combination as described by claim 1 wherein said motor control means further includes pressure sensor means in said third oil conduit means, said motor control means being operative to de-energize said electric motor means and close said first solenoid valve means when said pressure sensor means detects a value of oil pressure within said third oil conduit means to be less than a predetermined value.

3. A combination as described by claim 2 further comprising alarm signal means for emitting an alarm when either of said oil flow or oil pressure values are less than said predetermined values.

4. The apparatus combination comprising:
   an electric power transmission device selected from the group consisting of a transformer, load tap changer, breaker, closure, reclosure, switch and switching bank;
   a quantity of dielectric oil for circulation through said power transmission device.
   a circulation pump having suction and discharge conduits connected to said power transmission device;
   an electric motor for driving said circulation pump to circulate said dielectric oil through said suction and discharge conduits and said power transmission device; and,
   an electric power control circuit for starting and stopping said electric motor, said power control circuit comprising a first switch means responsive to oil flow in said suction conduit above a minimum threshold flow value to continue power delivery to said motor and a first solenoid valve means in said suction conduit to interrupt oil flow from said power transmission device to said pump when oil flow within said suction conduit falls below said minimum threshold flow value.

5. An apparatus combination as described by claim 4 wherein a loss of fluid flow within said suction conduit below said minimum threshold flow value disconnects said electric motor and said first solenoid valve from an electric power source.

6. An apparatus combination as described by claim 4 wherein said control circuit further comprises second switch means to disconnect power delivery from said motor when pressure within said pump discharge conduit falls below a minimum threshold pressure value.

7. An apparatus combination as described by claim 6 further comprising a housing substantially enclosing said pump, said housing having a sump zone to gravitationally receive free dielectric oil within said housing and third switch means in said power control circuit to disconnect power delivery from said motor when a substantial presence of said dielectric oil is detected in said sump zone.

8. A method of monitoring the operation of an insulation oil filter circulation system for an electric power transmission device selected from the group consisting of transformers, load tap changers, breakers, closures, reclosures, switches and switching banks including an electric drive means for an insulation oil circulation pump connected to said power transmission device by a pump suction conduit and a pump discharge conduit, said electric drive means being operatively responsive to an electric power control circuit, said method comprising the step of sensing insulation oil flow rate within said pump suction conduit and signaling said control circuit to discontinue the operation of said drive means and interrupt insulation oil flow from said power transmission device through said suction conduit by closing said suction conduit when said flow rate falls below a minimum threshold flow value.

9. A method as described by claim 8 further comprising the step of sensing insulation oil pressure within said pump discharge conduit and signaling said control circuit to discontinue the operation of said drive means and closing said suction conduit when said oil pressure falls below a minimum threshold pressure value.

10. A method as described by claim 9 wherein said pump is supported above said sump zone to accumulate losses of insulation oil from said pump and conduits into said sump zone, said method further comprising the step of sensing the presence of oil within said sump zone and signaling said control circuit to discontinue the operation of said drive means and close said suction conduit when the presence of insulation oil within said sump zone accumulates above a maximum threshold value.

11. A method as described by claim 8 wherein insulation oil flow through said pump suction conduit is interrupted at a point proximate of said power transmission device when said drive means operation is discontinued.

12. A method as described by claim 11 wherein flow through said pump suction conduit is interrupted by a solenoid valve that is normally closed when de-energized.

13. A method as described by claim 8 wherein said signaling of said control circuit to discontinue the operation of said drive means when said flow rate falls below a minimum threshold flow value is ineffective for a time interval that is sufficient to permit a normal operational start of said insulation oil circulation pump.

14. An apparatus combination as described by claim 4 further comprising filter means disposed in said pump discharge conduit between said pump and said power transmission device.

15. An apparatus combination as described by claim 6 further comprising filter means disposed in said pump discharge conduit between said pump and said power transmission device.

16. An apparatus combination as described by claim 15 wherein said filter means is disposed in said pump discharge conduit between said power transmission device and said second switch means.

* * * * *